United States Patent
Wills et al.

(10) Patent No.: US 7,263,825 B1
(45) Date of Patent: Sep. 4, 2007

(54) APPARATUS, SYSTEM, AND METHOD FOR DETECTING AND LABELING A FILTER REGENERATION EVENT

(75) Inventors: Joan Wills, Nashville, IN (US); J. Steve Wills, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 11/227,824

(22) Filed: Sep. 15, 2005

(51) Int. Cl.
  *F01N 3/00* (2006.01)
(52) U.S. Cl. .............. 60/295; 60/274; 60/277; 60/297; 55/DIG. 30; 701/102; 701/107
(58) Field of Classification Search .......... 60/274, 60/286, 277, 295, 297, 311; 55/DIG. 30; 701/101, 102, 107
See application file for complete search history.

(56) References Cited

U.S. PATENT DOCUMENTS

| | | | |
|---|---|---|---|
| 5,287,698 A * | 2/1994 | Shinzawa et al. | 60/286 |
| 6,405,528 B1 | 6/2002 | Christen et al. | 60/295 |
| 6,594,990 B2 * | 7/2003 | Kuenstler et al. | 60/295 |
| 6,622,480 B2 | 9/2003 | Tashrio et al. | 60/295 |
| 6,756,904 B2 | 6/2004 | Kinugawa et al. | 340/606 |
| 6,758,039 B2 | 7/2004 | Kuboshima et al. | 60/311 |
| 6,820,418 B2 * | 11/2004 | Nakatani et al. | 60/297 |
| 6,829,889 B2 | 12/2004 | Saito et al. | 60/291 |
| 6,829,890 B2 * | 12/2004 | Gui et al. | 60/295 |
| 6,854,265 B2 * | 2/2005 | Saito et al. | 60/295 |
| 6,907,873 B2 | 6/2005 | Hamahata | 123/676 |
| 6,966,178 B2 * | 11/2005 | Saito et al. | 60/295 |
| 7,007,463 B2 * | 3/2006 | Shirakawa | 60/297 |
| 2002/0196153 A1 | 12/2002 | Kinugawa et al. | 340/606 |
| 2003/0167757 A1 | 9/2003 | Boretto et al. | 60/295 |
| 2004/0139733 A1 * | 7/2004 | Koga et al. | 60/280 |
| 2004/0172933 A1 | 9/2004 | Saito et al. | 60/277 |
| 2004/0204818 A1 | 10/2004 | Trudell et al. | 701/114 |
| 2005/0022520 A1 * | 2/2005 | Shirakawa et al. | 60/297 |
| 2005/0120712 A1 * | 6/2005 | Tsutsumoto et al. | 60/297 |
| 2005/0166582 A1 * | 8/2005 | Gotou | 60/297 |

* cited by examiner

*Primary Examiner*—Tu M. Nguyen
(74) *Attorney, Agent, or Firm*—Kunzler & Associates; J. Bruce Schelkopf

(57) ABSTRACT

An apparatus, system, and method are disclosed for detecting and evaluating a filter regeneration event. The apparatus, in one embodiment, is configured to determine whether an oxidation rate of soot accumulated on a particulate filter has attained a level sufficient to indicate that a filter regeneration event is occurring. The apparatus may include an input module for receiving input relative to engine operating conditions and exhaust gas produced as a byproduct of engine operation, an oxidation module for communicating with the input module and for determining an oxidation rate of soot accumulated on a particulate filter from the input, and a regeneration detection module to determine whether a filter regeneration event is occurring. The apparatus may further categorize a detected filter regeneration event and to facilitate defining the actual condition of soot on a particulate filter.

11 Claims, 7 Drawing Sheets

| Category 600 | Condition 610 | Control Flag 620 | Response 630 |
|---|---|---|---|
| Partial 602 | Minimum Amt. of Soot Oxidized; Remaining Soot Load Greater Than Minimum Amt. Allowable | Yes | 1. Adjust Counter Fixed Amount 2. Adjust Counter a Calculated Amount |
| Complete 604 | Minimum Amt. of Soot Oxidized; Remaining Soot Load Satisfies Minimum Amt. Allowable | Yes | Reset Counter to Preset Value |
| Deep Clean 606 | Temp. of Particulate Filter after Complete Regeneration Remains above a Calibratible Threshold for a Calibratible Time after Soot Load Reaches Calibratible Low | Yes | Reset Counter to Preset Value |
| Ineffective 608 | 1. Controller Initiates Active Regen. Event, But Regen. Temp. Is Not Achieved for a Calibratible Time  2. Regen. Temp. Is Achieved, But a Calibratible Level of Soot Oxidation Is Not Achieved | Yes, after a Calibratible Time | 1. Initiate Warning 2. Apply New Conditions 3. Terminate Regen. Request 4. Record Ineffective |

Fig. 6

APPARATUS, SYSTEM, AND METHOD FOR DETECTING AND LABELING A FILTER REGENERATION EVENT

BACKGROUND OF THE INVENTION

1. Field of the Invention

This invention relates to exhaust gas after-treatment systems and more particularly to apparatus, systems and methods for detecting and labeling a filter regeneration event.

2. Description of the Related Art

Environmental concerns have motivated the implementation of emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC). Catalytic converters implemented in an exhaust gas after-treatment system have been used to eliminate many of the pollutants present in exhaust gas. However, to remove diesel particulate matter, typically a diesel particulate filter (DPF) must be installed downstream from a catalytic converter, or in conjunction with a catalytic converter.

A common diesel particulate filter comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially hazardous situations, accumulated particulate matter is commonly oxidized and removed in a controlled regeneration process before excessive levels have accumulated. To oxidize the accumulated particulate matter, exhaust temperatures generally must exceed the temperatures typically reached at the filter inlet. Consequently, additional methods to initiate regeneration of a diesel particulate filter may be used. In one method, a reactant, such as diesel fuel, is introduced into an exhaust after-treatment system to initiate oxidation of particulate buildup and to increase the temperature of the filter. A filter regeneration event occurs when substantial amounts of soot are consumed on the particulate filter. Partial or complete regeneration may occur depending on the duration of time the filter is exposed to elevated temperatures and the amount of particulate matter remaining on the filter. Partial regeneration can contribute to irregular distribution of particulate matter across the substrate of a particulate filter.

Controlled regeneration traditionally has been gauged by set intervals, such as distance traveled or time passed. Interval based regeneration, however, has not proven to be effective for several reasons. First, regenerating a particulate filter with little or no particulate buildup lessens the fuel economy of the engine and exposes the particulate filter to unnecessary high temperature cycles. Second, if particulate matter accumulates excessively before the next regeneration, backpressure from blockage of the exhaust flow can negatively affect engine performance. In addition, regeneration with excessive levels of particulates present can potentially cause filter failure or the like. Consequently, particulate filters regenerated on a set interval must be replaced frequently to maintain the integrity of an exhaust gas after-treatment system.

Accurately estimating the amount of particulate matter accumulated in a particulate filter may facilitate determining when to initiate a timely controlled regeneration event. A common method for determining soot accumulation includes using a differential pressure sensor to measure the pressure change of exhaust gas upstream and downstream from a particulate filter. However, a significant factor in causing a backpressure estimate to be incorrect is maldistribution of particulate matter on the soot filter caused by a partial regeneration of soot.

From the foregoing discussion, it should be apparent that a need exists for an apparatus, system, and method for detecting and evaluating filter regeneration events. Beneficially, such an apparatus, system, and method would enable a control system to label the filter regenerations events and to provide information about filter regeneration events to other control mechanisms. In addition, the apparatus, system, and method would enable effective and timely regeneration of a diesel particulate filter, increase the fuel economy of a vehicle, extend the life expectancy of a diesel particulate filter, and increase the overall efficiency of an engine.

SUMMARY OF THE INVENTION

The present invention has been developed in response to the present state of the art, and in particular, in response to the problems and needs in the art that have not yet been fully solved by currently available exhaust gas after-treatment systems requiring particulate filter regeneration. Accordingly, the present invention has been developed to provide an apparatus, system, and method for detecting filter regeneration events that overcome many or all of the above-discussed shortcomings in the art.

The apparatus, in one embodiment, is configured to determine whether an oxidation rate of soot accumulated on a particulate filter has attained a level sufficient to indicate that a filter regeneration event is occurring. The apparatus may include an input module for receiving input regarding engine operating conditions and exhaust gas produced as a byproduct of engine operation, an oxidation module for communicating with the the input module and determining an oxidation rate of soot accumulated on a particulate filter from input from the input module, and a regeneration detection module to determine whether a filter regeneration event is occurring. The apparatus may further include a particulate module that determines the rate of soot deposition on the particulate filter.

The apparatus is further configured, in one embodiment, to determine an amount of soot accumulated on the particulate filter and may further be configured to determine an amount of soot oxidized on a particulate filter. In one embodiment, the regeneration detection module includes a categorization module that categorizes a detected regeneration event relative to the determined amount of soot oxidized and the amount of soot accumulated on the particulate filter. In one embodiment, the detected regeneration events are categorized as a deep clean regeneration event, a complete regeneration event, and a partial regeneration event. In addition, a filter regeneration event may be labeled as ineffective if certain conditions are not satisfied. In a further embodiment, the determined filter regeneration event data may be used to determine the distribution of particulate matter on the particulate filter.

A system of the present invention is also presented for detecting a regeneration event on a particulate filter. The system may be embodied in an exhaust gas after-treatment system. In particular, the system, in one embodiment, includes an internal combustion engine, a differential pressure sensor, and a controller for communicating with the internal combustion engine and the differential pressure sensor and for determining an oxidation rate of soot accumulated on a particulate filter. The controller further determines that a filter regeneration event is occurring. In addition, a model of soot oxidation may be used to determine the oxidation rate of soot.

A method of the present invention is also presented for detecting a filter regeneration event and for determining the effectiveness of the filter regeneration event. The method in the disclosed embodiments substantially includes the steps necessary to carry out the functions presented above with respect to the operation of the described apparatus and system. In one embodiment, the method includes receiving input relative to engine operating conditions and exhaust gas, determining an oxidation rate of soot accumulated on a particulate filter, and determining whether the oxidation rate of soot accumulated on a particulate filter has attained a level sufficient to indicate that a filter regeneration event is occurring. The method may further include determining the rate of soot deposition, determining an amount of soot accumulated, determining an amount of soot oxidized during a detected filter regeneration event, and categorizing the regeneration event.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables a controller to detect a filter regeneration event and to respond to the event according to the nature of the regeneration event. Categorizing, or labeling, the detected regeneration event further enables a controller to easily trigger an appropriate response. Consequently, the exhaust gas after-treatment system may more easily preserve soot filter reliability and achieve greater fuel economy. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a chart illustrating one embodiment of an regeneration event category with a corresponding triggered event in accordance with the present invention.

DETAILED DESCRIPTION OF THE INVENTION

Figure 1:
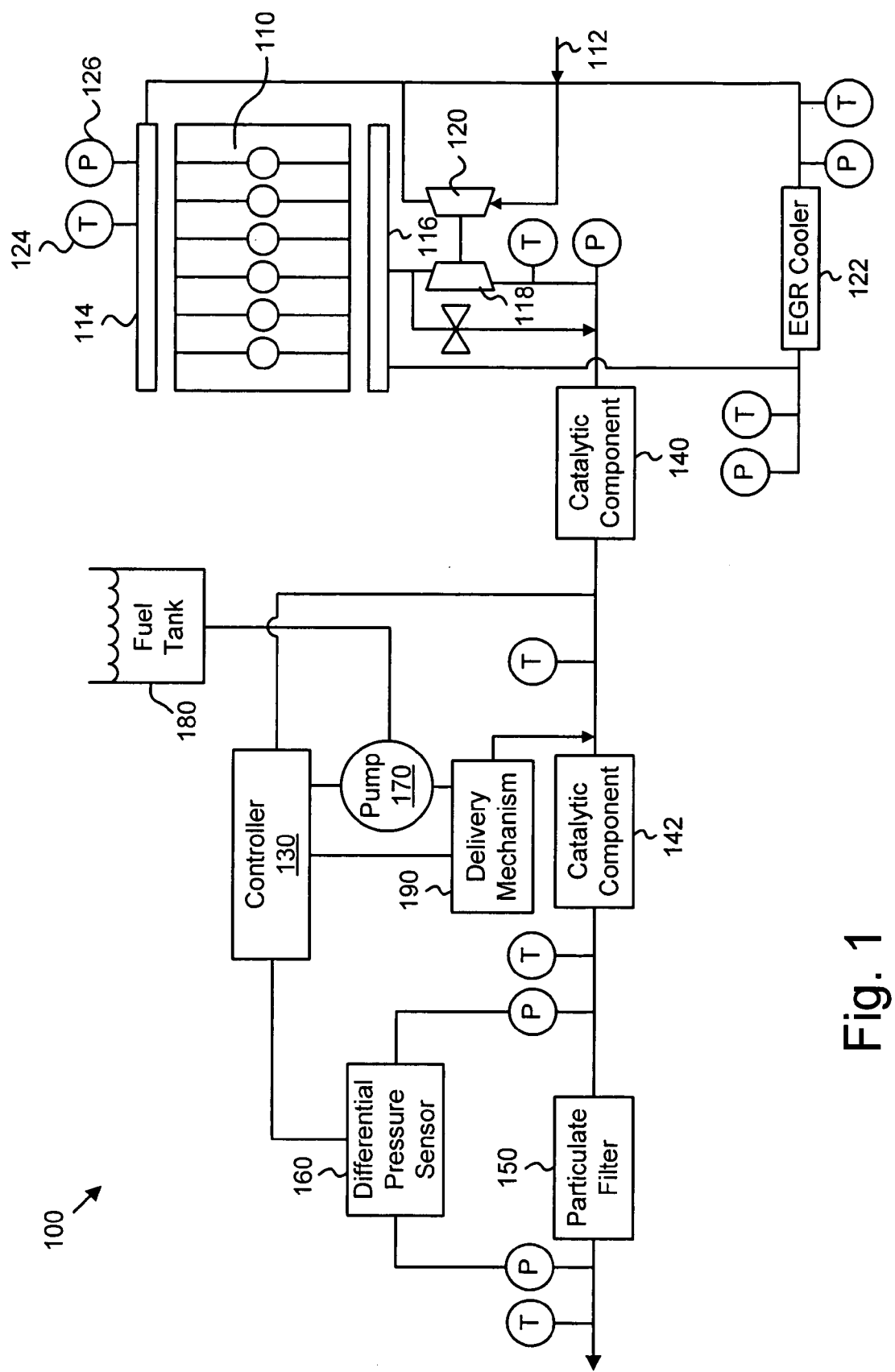
FIG. 1 is a schematic block diagram illustrating one embodiment of an exhaust gas after-treatment system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an exhaust gas after-treatment system 100 in accordance with the present invention. The exhaust gas after-treatment system 100 may be implemented in conjunction with an internal combustion engine 110 to remove various chemical compounds and particulates from emitted exhaust gas. As illustrated, the exhaust gas after-treatment system 100 may include an internal combustion engine 110, a controller 130, one or more catalytic components 140, 142, a particulate filter 150, a differential pressure sensor 160, a reactant pump 170, a fuel tank 180, and a reactant delivery mechanism 190. Exhaust gas treated in the exhaust gas after-treatment system 100 and released into the atmosphere consequently contains significantly fewer pollutants, such as diesel particulate matter (PM), nitrogen oxides ($NO_x$), hydrocarbons (HC), and carbon monoxide (CO), than untreated exhaust gas.

The exhaust gas after-treatment system 100 may further include an air inlet 112, an intake manifold 114, an exhaust manifold 116, a turbocharger turbine 118, a turbocharger compressor 120, an exhaust gas recirculation (EGR) cooler 122, temperature sensors 124, and pressure sensors 126. In one embodiment, an air inlet 112 vented to the atmosphere enables air to enter the exhaust gas after-treatment system 100. The air inlet 112 may be connected to an inlet of the intake manifold 114. The intake manifold 114 includes an outlet operatively coupled to the compression chamber of the internal combustion engine 110. Within the internal combustion engine 110, compressed air from the atmosphere is combined with fuel to power the engine 110. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 may pass through a catalytic component 140, 142 and/or particulate filters 150 in order to reduce the number of pollutants contained in the exhaust gas before venting the exhaust gas into the atmosphere. Another portion of the exhaust gas may be re-circulated to the engine 1110. In certain embodiments, the engine gas recirculation cooler 122, which is operatively connected to the inlet of the intake manifold 114, cools exhaust gas in order to facilitate increased engine air compression. In certain embodiments, a portion of the exhaust gas may be diverted through a system valve to an exhaust bypass (not shown). The exhaust gas bypass may have an outlet operatively linked to the inlet of a particulate filter 150, which may comprise a catalytic soot filter in certain embodiments.

Exhaust gas may pass through a catalytic component 140, such as a hydrocarbon (HC) oxidation catalyst or the like, in certain embodiments. Various sensors, such as temperature sensors 124, pressure sensors 126, and the like, may be strategically disposed throughout the exhaust gas after-treatment system 100 and may be in communication with the controller 130 to monitor operating conditions.

The exhaust gas after-treatment system 100 may direct the exhaust gas to the inlet of another catalytic component 140, such as a $NO_x$ adsorption catalyst or the like. Alternatively or in addition, a particulate filter 150 may comprise a catalytic soot filter in certain embodiments. Particulate matter in the exhaust gas, such as soot and ash, may be retained within the particulate filter 150. The exhaust gas may subsequently be vented to the atmosphere.

In addition to filtering the exhaust gas, the exhaust gas after-treatment system 100 may include a system for introducing a reactant, such as fuel, into the exhaust gas or into components of the exhaust gas after-treatment system 100. The reactant may facilitate oxidation of various chemical compounds adsorbed within catalytic components 142 and may also facilitate removal of soot accumulated on the particulate filter 150. The fuel tank 180, in one embodiment, may be connected to the reactant pump 170. The pump 170, under direction of the controller 130, may provide fuel or the like to a reactant delivery mechanism 190, such as a nozzle, which may be operatively coupled to the inlet of the catalytic component 142 and/or a particulate filter 150. The reactant pump 170, the reactant delivery mechanism 170, and an exhaust valve, in certain embodiments, may be directed by the controller 130 to create an environment conducive to oxidation of chemical compounds.

One method to regenerate at least one component of the exhaust gas after-treatment system 100, according to one embodiment, comprises periodically reducing the flow of exhaust gas to a catalytic component 142 undergoing regeneration and introducing reactant into the catalytic component 142. During the same duty cycle, the controller 130 directs the reactant pump 170 to deliver reactant to the reactant delivery mechanism 190. The controller 130 subsequently regulates the delivery mechanism 190 to deliver selected amounts of reactant into a catalytic component 142. During the same duty cycle after each injection of reactant, the delivery mechanism 190 may be closed and no additional reactant delivered directly to the catalytic component 142. The effect of this sequence produces a series of injections of reactant into the inlet of the catalytic component 142 during a given duty cycle. As a result, the controller 130 may control the rate of regeneration of the catalytic component 142 and/or the particulate filter 150.

In certain embodiments, the exhaust gas after-treatment system 100 may be configured to determine an appropriate time to introduce reactant into the system 100 to remove accumulated soot from a particulate filter 150. Appropriate timing of active filter regeneration may contribute to an increase in the fuel economy of a vehicle, extended life expectancy of a particulate filter, and increased overall efficiency of the engine 110. In addition, developing a method to detect when a filter regeneration event is occurring, including soot oxidation occurring without introduction of a reactant, may facilitate determining optimal timing for introducing a reactant into the exhaust gas after-treatment system 100.

Two primary mechanisms contribute to soot removal or filter regeneration. First, the engine 110 generates a quantity of $NO_2$ in its exhaust stream. At relatively low temperatures, $NO_2$ oxidizes a portion of the soot on the particulate filter 150, releasing the soot, typically as CO or $CO_2$. This mechanism is referred to as "noxidation" in this patent and generally occurs unaided by an additional reactant or the like.

The noxidation mechanism is often insufficient to keep the particulate filter 150 at acceptable soot levels. Consequently, an additional oxidation mechanism is sometimes required to remove the soot more quickly. One implementation of the second mechanism is to raise the temperature of the exhaust stream to the point where simple molecular oxygen ($O_2$) will oxidize the soot. The temperature at which $O_2$ reacts with the soot is generally higher than the temperature at which the engine typically runs under normal loads. This mechanism is called "oxidation" in this patent, generally as compared to noxidation. The oxidation mechanism consumes soot at a much higher temperature and much more quickly than the noxidation mechanism. The term "oxidation" as also used herein is also used in the generally accepted and generic sense, comprising both oxidation from $O_2$ and oxidation from $NO_2$.

If the soot level is too high in the particulate filter 150 when the oxidation mechanism is initiated, oxidation can generate heat within the particulate filter 150 much more quickly than the heat is dissipated, which may cause local temperature spikes within the particulate filter 150, resulting in unnecessary wear or even mechanical failure of the particulate filter 150.

Before an oxidation-based regeneration is attempted, the controller 130 must be as sure of the overall soot level as possible. A primary feedback mechanism to determine the soot level on the particulate filter 150 is the use of a delta-pressure sensor 160 across the particulate filter 150. With a known flow rate and pressure drop across the particulate filter 150, the amount of soot on the particulate filter 150 can be estimated through use of the sensor 160. However, a delta-pressure feedback mechanism is only intermittently dependable for determining soot levels. The differential pressure sensor 160, for example, is known to become unreliable under certain conditions, such as while soot is being consumed on the particulate filter 150 during a filter regeneration event, when the accumulated soot is mal-distributed across the particulate filter 150, and during periods of low exhaust gas flow rate.

In another method, a particulate accumulation estimate is derived from equations relating to known physical-chemical characteristics. These mathematical estimations, however, can integrate errors over time and deviate from real soot loading conditions.

The two methods may be used together to get a better overall estimate of soot loading on the filter. However, one primary requirement of using the two methods together is to understand when the backpressure estimate is not providing an accurate soot loading measurement. One of the most significant factors in causing the backpressure estimate to be incorrect is the maldistribution of soot on the soot filter due to a partial regeneration event. Conversely, one of the most significant factors in restoring confidence in the backpressure estimate is the full regeneration of the soot filter to a "clean" or "deep clean" condition, each of which follows a filter regeneration event.

Since no direct sensor is currently available to measure the soot load or the distribution of particulate matter on the filter, a number of "virtual sensors" may facilitate estimating an actual condition. An apparatus, system and method for providing combined sensor and estimated feedback by determining a predicted reliability of a sensor response and/or an estimation are disclosed in related application Ser. No. 11/227,320 entitled "APPARATUS, SYSTEM, AND METHOD FOR PROVIDING COMBINED SENSOR AND ESTIMATED FEEDBACK," incorporated herein by reference.

A measure of the rate of soot consumption, or oxidation, occurring on the soot filter may facilitate properly utilization of the differential pressure sensor 160 for estimating soot loading on the particulate filter 150. In addition, determining the rate of oxidation may facilitate optimizing and limiting heat generation within the particulate filter 150. Thus, a model of soot generation and consumption rates as well as overall soot levels on the particulate filter 150 may be desirable for use in combination with the feedback mechanism. One method for determining an oxidation rate is disclosed in related application Ser. No. 11/227,403 entitled, "APPARATUS, SYSTEM, AND METHOD FOR ESTIMATING PARTICULATE CONSUMPTION," incorporated herein by reference.

In addition, determining a rate of soot production, or a rate of soot deposition, may further facilitate determining when a filter regeneration event is occurring, such as is disclosed in related application Ser. No. 11/227,857 entitled "APPARATUS, SYSTEM, AND METHOD FOR ESTIMATING PARTICULATE PRODUCTION," incorporated herein by reference. The rate of soot deposition may facilitate determining a net soot accumulation rate, which may help indicate when significant amounts of accumulated soot are being consumed.

Figure 2:
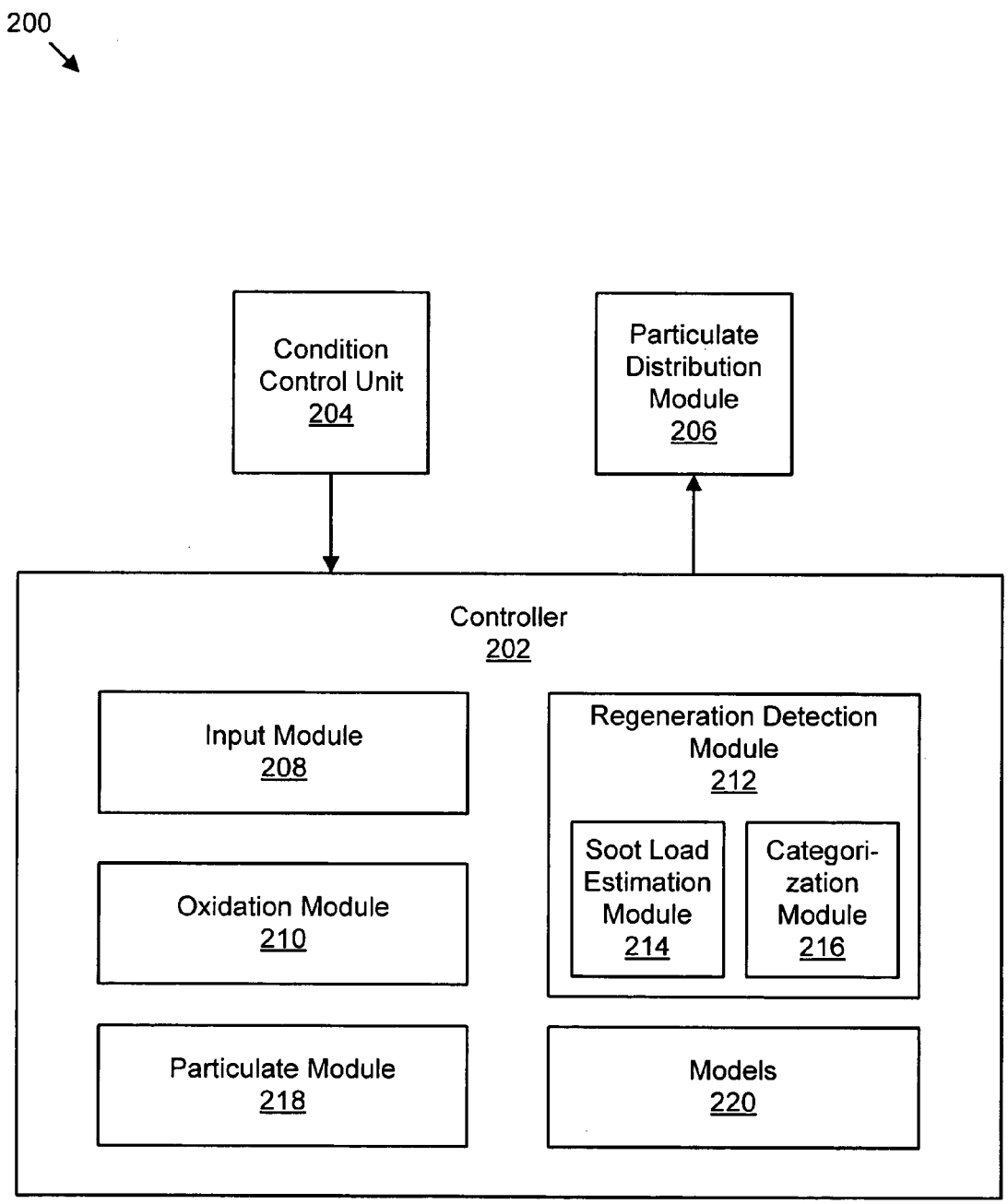
FIG. 2 is a schematic block diagram illustrating one embodiment of a regeneration event detection control system in accordance with the present invention.

FIG. 2 illustrates one embodiment of a regeneration event detection control system 200 in accordance with the present invention. The control system 200 as depicted is operatively connected to the system 100 and includes a controller 202, a condition control unit 204, a particulate distribution module 206, an input module 208, an oxidation module 210, a regeneration detection module 212, a soot load estimation module 214, a categorization module 216, a particulate module 218, and one or more models 220. The controller 202 is configured to determine when a filter regeneration event is occurring, as well as whether a regeneration event that has been actively initiated by an engine controller 130 is effective. In addition, when a filter regeneration event is complete, the controller 202 categorizes the filter regeneration event in order to facilitate the determination of further soot estimates, such as filter soot load mass estimates and filter particulate distribution.

A condition control unit 204, in certain embodiments, supplies input relative to engine operating conditions and exhaust gas produced as a byproduct of engine operation, which may include input from a differential pressure sensor 160. The input may also include, but is not limited to, engine speed rate, engine timing, fuel rate, oxygen percentage, temperature, engine-out oxygen and nitrous oxides, filter back pressure, and the like.

The input module 208 may receive input from the condition control unit 204 and/or other input sources. The input module 208 receives data that functions as the foundation for determining when a regeneration event is occurring. Multiple modules may use the input data to determine various conditions within the exhaust gas after-treatment system 100. The input may be combined to facilitate the configuration of various virtual sensors to determine the condition of the particulate matter on the particulate filter 150, since currently no direct sensors are available to measure accumulated ash and soot.

The oxidation module 210 may communicate with the input module 208 and use the received input data to determine an oxidation rate of soot accumulated on a particulate filter 150. In one embodiment, the oxidation rate is determined by calculating a value from basic Arrhenius principles describing chemical properties and the effect temperature has on accelerating the rate of a chemical reaction. The input data may include data representing the bed temperature in a particulate filter 150, the amount of oxygen ($O_2$) present in exhaust gas, and the amount of soot accumulating on the particulate filter 150. In an alternative embodiment, the data may be selected to determine a rate of oxidation from $NO_2$ (noxidation). Advantageously, the oxidation/noxidation rates may be determined without depending entirely on a delta pressure sensor estimate.

Figure 3:
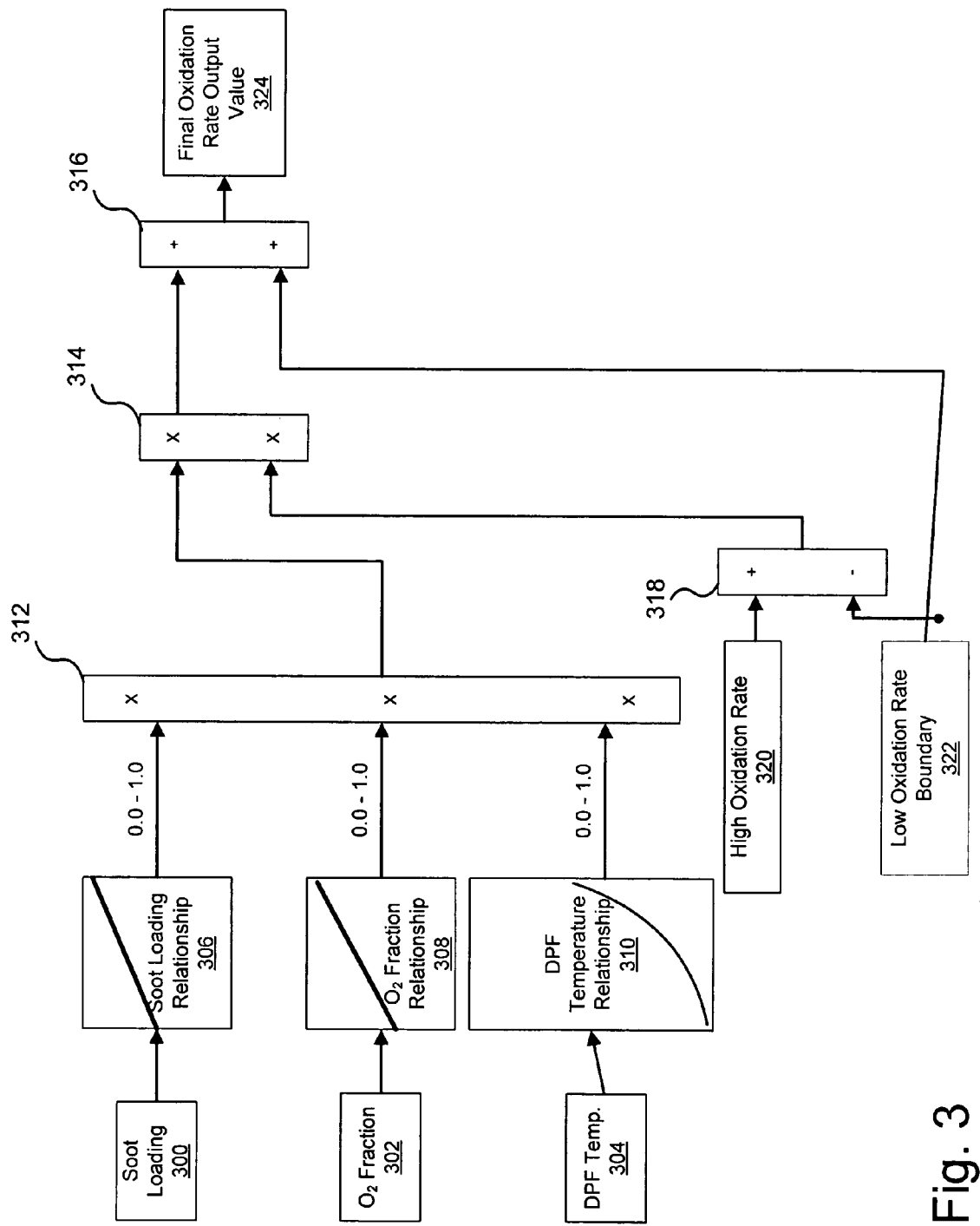
FIG. 3 is a schematic block diagram illustrating one embodiment of a process flow for obtaining an oxidation rate output value in accordance with the present invention.
Figure 4:
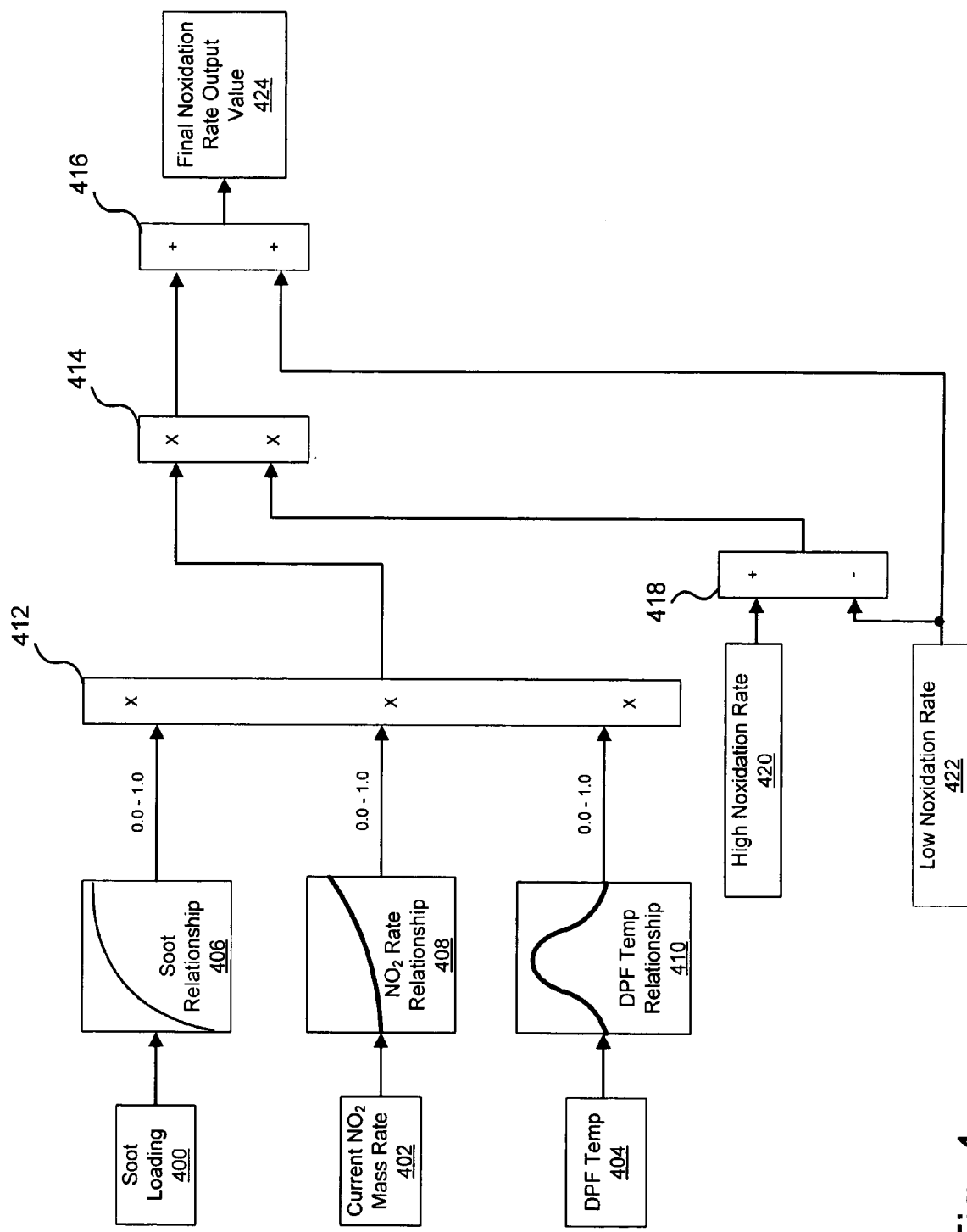
FIG. 4 is a schematic block diagram illustrating another embodiment of a process flow for obtaining a noxidation rate output value in accordance with the present invention.

To further define an expected regeneration or oxidation condition, one or more models 220 may be established and referenced. In one embodiment, the model 220 comprises data relative to a rate of oxidation created from empirical data. FIGS. 3 and 4, further described below, illustrate one embodiment of an oxidation rate output value 324 and a noxidation rate output value 424 respectively derived from an empirical model 220.

Referring again to FIG. 2, the regeneration detection module 212 determines whether an oxidation rate of soot accumulated on the particulate filter 150 has attained a level sufficient to indicate a filter regeneration event. In one embodiment, a set of conditions may be established such that a control flag may be signaled when the conditions are met. For example, an oxidation rate that achieves a specific level and/or temperature for a determined duration may indicate a condition of the soot accumulated on the particulate filter 150.

In one embodiment, a rate of soot accumulation is determined from multiple delta-pressure mass estimates taken over time, which may be compared to a rate of accumulation derived from a plurality of model-based mass estimates calculated consecutively. In one embodiment, the particulate module 218 determines a rate of particulate matter output, or a rate of soot deposition. The rate of soot deposition may be combined with a rate of soot oxidation to determine a net soot accumulation rate. If the determined net soot accumulation rate indicates a high rate of soot consumption on the filter 150, then the regeneration detection module 212 may determine that a regeneration event is occurring.

In certain embodiments, the regeneration detection module 212 further determines an active regeneration command results in a significant regeneration event. For example, if the engine controller 130 initiates a regeneration event and the regeneration detection module 212 confirms that a regeneration event is taking place, the regeneration detection module 212 may further determine the condition of the soot on the particulate filter 150 to provide further information to the engine controller 130. In contrast, if an active command for regeneration is issued and the required conditions are not met, the regeneration event may be labeled as ineffective, which is described below in greater detail relative to FIG. 6.

The regeneration detection module 212 may comprise a soot load estimation module 214 and a categorization module 216. In one embodiment, the soot load estimation module 214 is configured to determine an amount of soot accumulated on the particulate filter 150 at the beginning and the end of a detected filter regeneration. In one embodiment, the differential pressure sensor 160 may provide feedback to determine an estimated amount. Alternatively, other methods, such as an engine out particulate matter estimation, an estimate derived from an estimated accumulation rate, or a combination may facilitate determining an estimated soot load.

The regeneration detection module 212 may also determine an amount of soot oxidized in certain embodiments. In one embodiment, the amount of soot oxidized may be estimated by determining the beginning and end soot accumulation amount following a detected regeneration event. Alternatively, the amount may be derived from an estimated accumulation rate or a determined oxidation rate. The amount of soot oxidized may facilitate determining a type of filter regeneration event.

In one embodiment, the categorization module 216 defines a category or characteristic type of filter regeneration event based on selected criteria or conditions. In one embodiment, the regeneration event categories comprise a partial regeneration event, a complete regeneration event, a deep clean regeneration event, and/or an ineffective regeneration event, discussed below in greater detail in relation to FIG. 6.

In certain embodiments, the regeneration detection module 212 triggers a response to a type of filter regeneration event. The significant trigger events may include partial regeneration, complete regeneration, deep clean regeneration, and ineffective regeneration. These events may be converted to Boolean values with or without an associated quantity or quantities, causing the regeneration detection module 212 to trigger a response that enables the system 100 to take appropriate action. For example, the particulate module 218 may decrement confidence in the delta pressure-based soot estimate upon detection of a partial regeneration event. The particulate module 218 may also reset confidence in the delta pressure-based soot estimate to a predetermined value upon detection of a complete regeneration event. The particulate module 218 may reset confidence in the delta pressure-based soot estimate to a different predetermined value upon detection of a deep clean regeneration event. Finally, the controller 130 may respond to an ineffective regeneration by changing regeneration behavior or stopping a regeneration attempt. Other system responses are possible.

In one embodiment, the particulate distribution module 206 receives data about a determined filter regeneration event and determines the manner of distribution of particulate matter on the filter 150. In one embodiment, the distribution is a determined value that is adjusted according to trigger event such as those listed above. A further disclosure is provided in related application Ser. No. 11/226,972 entitled "APPARATUS, SYSTEM, AND METHOD FOR DETERMINING THE DISTRIBUTION OF PARTICULATE MATTER ON A PARTICULATE FILTER," incorporated herein by reference.

Three primary inputs determine the accumulated soot level over time: the amount of soot generated by the engine and trapped on the particulate filter 150 (Input 1), the amount of soot consumed by noxidation (Input 2), and the amount of soot consumed by oxidation (Input 3). The combination of these three inputs comprises the net soot accumulation rate.

Defined theoretically known relationships to each of these inputs may be used to determine a net soot accumulation rate; however, the relationships are difficult to implement on an engine in an embedded controller. For soot generated by the engine (Input 1), the theoretical correlations require inputs from mechanisms—for example, the output of a smoke meter—which are not cost effective to implement in a production engine. To determine the amount of soot consumed by noxidation (Input 2), the relation depends strongly upon the temperature of the particulate filter 150. The temperature within the particulate filter 150, however, varies considerably, and the temperature measurements available for production engines often cannot describe these temperature variations acceptably. Thus, practical observations of noxidation rates vary considerably from the theoretically derived models.

To determine an amount of soot consumed by oxidation (Input 3), the relation depends even more strongly upon the temperature of the particulate filter 150 than for noxidation. The rate of oxidation also depends upon the local concentrations of soot within the particulate filter 150. The temperature and soot load combined cause the achieved rates of oxidation to be different, generally lower, than the theoretical estimates.

Models 220 that define a known relationship, which may be difficult to measure directly within a production engine, may mitigate the problems associated with determining an accurate oxidation rate, and consequently, an accurate soot load estimate. In certain embodiments, the models 220 may reference empirical data and provide an expected response relative to determined conditions and known relationships.

FIG. 3 illustrates one embodiment of a process flow for obtaining an oxidation rate output value 324 in accordance with the present invention. To determine the oxidation rate output value 324, input from a current soot loading 300, a current oxygen mass fraction 302, and a current particulate filter temperature 304 are each input into a corresponding model defining a relative relationship for the current value. Each of the relationship models for soot loading 306, oxygen mass fraction 308, and filter temperature 310 result in a normalized value, 0–1 in one embodiment, and contribute a percentage to the final oxidation rate output value 324. In addition, a high oxidation rate boundary 320 and a low oxidation rate boundary 322 may facilitate determining an accurate output value 324.

In one embodiment, the normalized values resulting from relationships 306, 308, and 310 are multiplied together. That normalized result is multiplied 314 with the oxidation rate range, comprising the range between the low oxidation rate 322 and the high oxidation rate 320, and added to the low oxidation rate 322 to determine the final oxidation rate output value 324.

FIG. 4 illustrates a similar embodiment of a process flow for obtaining a noxidation rate output value 424 in accordance with the present invention. To determine the noxidation rate output value 424, input from a current soot loading 400, a current oxygen mass fraction 402, and a current particulate filter temperature 404 are each input into a corresponding model defining a relative relationship for the current value. Each of the relationship models for soot loading 406, oxygen mass fraction 408, and filter temperature 410 result in a normalized value, 0–1 in one embodiment, and contribute a percentage to the final oxidation rate output value 424. In addition, a high oxidation rate boundary 420 and a low oxidation rate boundary 422 may facilitate determining an accurate output value 424.

In one embodiment, the normalized values resulting from relationships 406, 408, and 410 are multiplied together. That normalized result is multiplied 414 with the noxidation rate range, comprising the range between the low noxidation rate 422 and the high noxidation rate 320, and added to the low noxidation rate 322 to determine the final noxidation rate output value 324.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
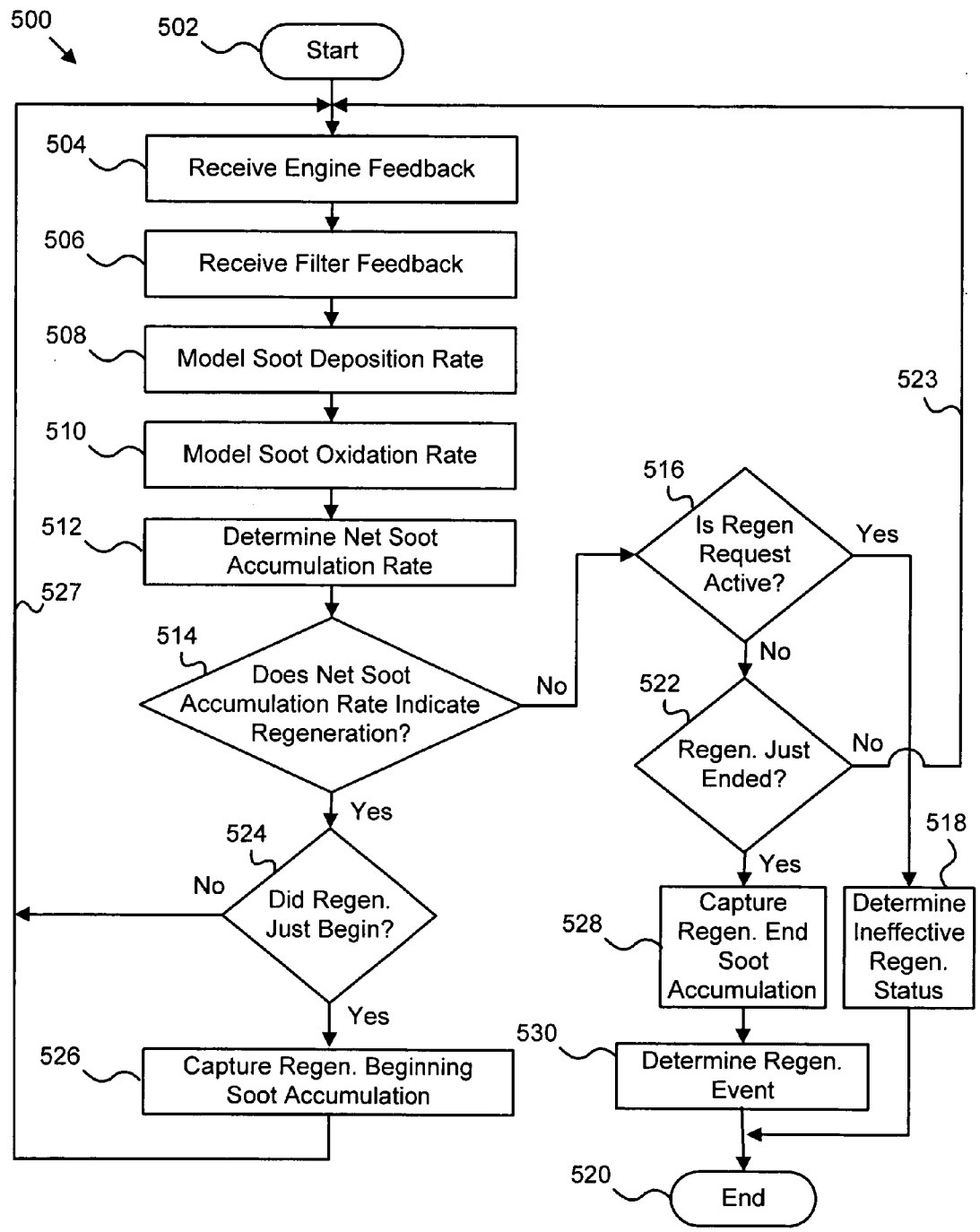
FIG. 5 is a schematic flow chart diagram illustrating one embodiment of a filter regeneration determination method of the present invention.

FIG. 5 illustrates one embodiment of a filter regeneration detection method 500 in accordance with the present invention. The filter regeneration detection method 500 as depicted begins 502 and includes receiving 504 engine feedback, receiving 506 filter feedback, modeling 508 a soot deposition rate, modeling 510 a soot oxidation rate, and determining a net soot accumulation rate 512. The method 500 may further include determining 514 whether a net soot accumulation rate indicates a filter regeneration event, determining 516 whether there is an active regeneration request, determining 518 an ineffective status, determining 524 whether a regeneration event has just begun, capturing 526 a regeneration beginning soot accumulation amount, determining 522 whether a regeneration event has just ended, capturing 528 a regeneration end soot accumulation amount, and determining 530 a type of filter regeneration event. The filter regeneration detection method 500 enables the exhaust gas after-treatment system 100 to accurately determine the condition of the soot accumulated on a particulate filter relative to conditions of soot consumption and soot accumulation.

In one embodiment, the input module 208 (FIG. 2) receives 504 input from an condition control unit 204 regarding engine operating conditions and exhaust gas, such as an amount of emitted particulate matter, the $O_2$ mass fraction, and the $NO_2$ mass fraction existing in the exhaust gas. Additional information may also be received such as a temperature of a particulate filter, a delta pressure value, a soot load estimate, and the like.

The particulate module 218 then determines 506 via differential pressure or other means the amount of particulate on the filter 150. The particulate module 218 then references a model 220 to determine 508 a soot deposition rate. In addition, the oxidation module 210 may reference 510 one or more models 220 for defining oxidation conditions, such as described in reference to FIGS. 3 and 4, in order to determine an oxidation rate for soot consumed on the particulate filter 150. The models 220 may be derived from empirical research and may help describe and determine 510 an accurate oxidation rate. In one embodiment, the oxidation module 210 determines the oxidation rate from input comprising the temperature of the particulate filter, the amount of $O_2$ (or $NO_2$) present in the exhaust gas, and the amount of soot accumulated on the particulate filter 150.

Of particular note, the oxidation rate may be determined 510 without relying solely on the differential pressure sensor 160 and the current delta pressure value. Determining the oxidation rate of soot and/or the amount of soot consumed by oxidation on a particulate filter may facilitate determining an accurate estimation of soot remaining on the particulate filter. Consequently, the oxidation rate may facilitate estimating a current soot load during periods of time when the delta pressure mass estimate is determined to be unreliable.

The regeneration detection module 212 then determines 512 the net rate of soot accumulation from the input data. A negative accumulation rate value may indicate a filter regeneration event under certain conditions, which may or may not be utilized to determine whether the particulate filter is experiencing a regeneration event. In addition, the net accumulation rate may facilitate determining an amount of soot oxidized.

The regeneration detection module 212 may use the determined net soot accumulation rate to determine 514 if a filter regeneration event is occurring. The regeneration detection module 212 may reference a set of conditions and/or set parameters to determine when a substantial amount of soot is being consumed. Once a regeneration event is detected, the information may be used to determine other conditions relative to a particulate filter 150, such as soot distribution, an estimated soot load, etc.

When a filter regeneration event is detected 514, the regeneration detection module 212 determines 524 whether the filter regeneration has just begun. If so, the regeneration detection module 212 determines a beginning amount of soot accumulation and loops 527 to receive further engine feedback 504. If the regeneration event is in process, the method 500 loops to receive engine feedback 504 without determining a beginning soot accumulation amount.

If a filter regeneration event is not detected 514, the regeneration detection module 212 determines 516 if a request for a regeneration event is active. If a request is active, the regeneration detection module 212 may determine that the requested regeneration event was ineffective and the method 500 ends.

If the regeneration request is not active 516, the regeneration detection module 212 may determine 522 that a regeneration event has just ended and may capture 528 an end soot load estimate. If the regeneration event has not ended, the method 500 loops 523 to continue receiving 504 engine feedback.

After capturing an end soot load estimate 528, the regeneration detection module 212 may then determine 530 the type of regeneration event that has occurred by comparing an amount of soot oxidized to the amount of accumulated soot on the particulate filter 150. A beginning soot accumulation amount and an end soot accumulation amount may facilitate determining a type of filter regeneration event. In certain embodiments, a category may describe a type of filter regeneration. In one embodiment, the detected regeneration events are labeled and defined as trigger events to facilitate a controller or the like to determine a subsequent action following a specific type of regeneration. The method 500 then ends.

FIG. 6 illustrates in greater detail one embodiment of a set of descriptive categories 600. A detected filter regeneration that has reached a specified level of soot oxidation and/or a specified temperature may be monitored to determine the type of the filter regeneration. In one embodiment, a detected filter regeneration is labeled as either a partial 602 regeneration, a complete 604 regeneration, a deep clean 606 regeneration, or an ineffective 608 regeneration. The specific category 600 for a regeneration event cannot be determined until that regeneration event stops, as determined by the rates of oxidation, noxidation and soot accumulation rather than as determined by the control flag that may be associated with a regeneration event. The categories 600 are derived from the amount of soot remaining on the filter 150 at the end of the regeneration event combined with the amount of soot consumed during the regeneration event. Each category 600 has a determined set of conditions 610 that must be satisfied for a control flag 620 to trigger a corresponding response 630.

For a partial 602 regeneration event to be flagged 620, a determined oxidation rate must indicate that a minimal amount of soot has been oxidized. Once the oxidation rate reaches a specified minimal level based on measured conditions, the duration of time the filter 150 maintains a high temperature may be monitored to indicate an amount of soot consumed and/or an amount of soot remaining on the filter 150. If the amount of soot remaining on the filter 150 is greater than a minimal amount allowable, a counter or the like may be decremented a set amount to indicate that a partial regeneration event has occurred and there may be some mal-distribution of soot on the particulate filter 150.

In one embodiment, the amount of soot oxidized may be calculated, and the decremented counter value may correspond to the amount of soot oxidized during the partial regeneration event. Consequently, an event that burns an amount of soot corresponding to more mal-distribution will allow for a larger decrement than an event that burns an amount of soot corresponding to less mal-distribution. The amount of mal-distribution caused by a given partial regeneration is dependent upon particulate filter sizing and must be determined experimentally for a given set of hardware. The experimentation required for this may comprise inducing a partial regeneration of a filter, and subsequent delta pressure mapping versus flow to check for mal-distribution effects. In general, the amount of mal-distribution caused by a partial regeneration will peak at a middle value of soot oxidized on the particulate filter, and the mal-distribution will be lower when either small or large amounts of soot are oxidized. A partial regeneration may indicate a mal-distribution of soot on the particulate filter 150, which may thereby affect the reliability of the differential pressure sensor 160.

A complete 604 regeneration may be indicated by a detected oxidation rate that indicates that a minimal amount of soot has been oxidized and that a minimal amount of soot remains on the filter 150. Consequently, a counter or the like may be adjusted to indicate that the filter is "clean" by a set standard and that other controls may be adjusted accordingly. The soot that remains on the filter 150, in certain embodiments, may be minimal such that the resolution of the sensors and the like are not able to calibrate an accurate estimated amount. Some soot may remain, but not enough to negatively affect engine operation, exhaust gas backpressure, and the like.

In other embodiments, the amount of soot on the filter may be such that a complete regeneration nevertheless leaves the particulate filter in a mal-distributed state by design. This occurs because other factors drive the design complete regeneration level. For example, a given vehicle may only have limited opportunities to regenerate, and may only regenerate small amounts of soot at a time by design. This can be reflected by simply setting the counter preset value to a value that reflects the appropriate state of the filter upon a complete regeneration. Of course, it is well within the ordinary skill of one in the art to make a set of complete regeneration levels according to vehicle operating conditions, and to associate a different counter preset value with each different complete regeneration level.

A deep clean 606 regeneration may be flagged 620 when the filter 150 undergoes an oxidation rate that indicates a complete 604 regeneration, but favorable oxidation conditions remain at a high enough level for a specified duration of time to oxidize the uncalibratible amount of soot trapped in the particulate filter 150. In another embodiment, the system may regenerate the filter to a soot loading level set lower than the complete regeneration level. Thus, the system 100 may register the filter 150 as having no soot on the filter 150, because extra precautions have been taken to remove the negligible amounts of accumulated soot. In one embodiment, a counter, timer, or the like may be reset to zero when a deep clean 606 regeneration is determined. As a result, a history or account of regeneration events may be followed between deep clean 606 regenerations. The history of regeneration events may facilitate determining the distribution of soot on a filter as well as the actual amount of soot accumulated on the particulate filter 150.

In certain cases, some conditions for oxidation may be reached but the actual results are not achieved or are not calibratible. This may occur particularly when a controller 130 or the like requests an active filter regeneration. In one embodiment, the controller 130 may initiate a regeneration event, but because of an interruption or the like, an elevated temperature is not maintained for a calibratible time sufficient to oxidize a minimal amount of soot. Alternatively, a designated temperature level may be reached, but a minimal amount of soot oxidation may not be achieved.

In such cases, the response 630 may depend on the nature of the ineffective 608 regeneration event. A controller 130 may continue to attempt to increase the temperature of the particulate filter 150 to realize the desired results. A situation where the temperature is achieved but soot oxidation is not successful will be given as a flag to the main controls of the engine, and may be used, for example, as a part of system logic that determines whether catalyst on the particulate filter may have failed. Note that the thresholds for an ineffective regeneration determination and a partial regeneration determination are separate, and the controller 202 is not precluded from determining that a given regeneration is both partial and ineffective, depending upon the calibration settings of various thresholds.

Figure 7:
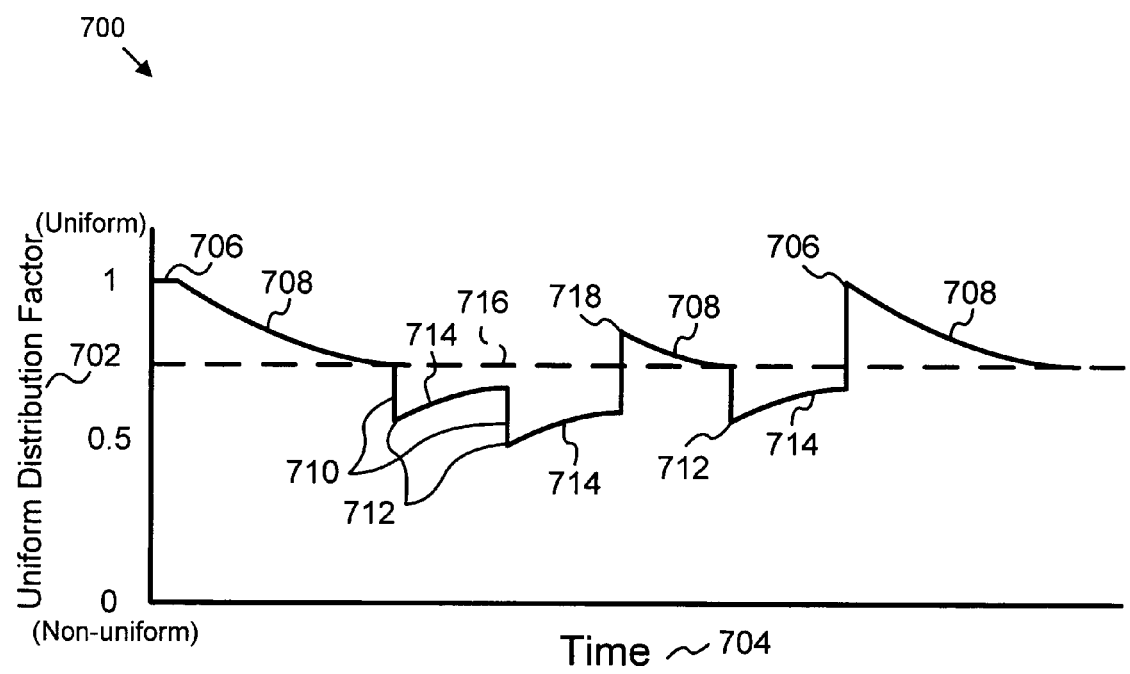
FIG. 7 illustrates one embodiment of a graph depicting a uniform distribution factor fluctuating over time as the distribution of particulate matter on a particulate filter changes during periods of engine operation and high oxidation rates in accordance with the present invention.

FIG. 7 illustrates one embodiment of output from the particulate distribution module 206 that determines the distribution of soot on the particulate filter 150. The control utilizes information regarding detected filter regeneration events and engine operating conditions to determine a uniform distribution factor 702. Graph 700 depicts a uniform distribution factor 702 fluctuating over time as the distribution of particulate matter on the particulate filter 150 changes during periods of engine operation and soot oxidation. The particulate distribution varies between uniform distribution and varying degrees of non-uniform distribution.

In the depicted graph, the uniform distribution factor 702 is a value y, wherein $0 \leq y \leq 1$. A uniform distribution factor 702 with a value of one represents a homogenous, even distribution of particulate matter on a particulate filter. In certain embodiments, a uniform distribution factor of one indicates a factory clean filter 150. A uniform distribution factor 702 of less than one signifies a variation in the distribution of particulate matter on the particulate filter. A uniform distribution factor 702 near zero implies substantial differences between areas of accumulated particulate matter and areas of little or no particulate accumulation. A negative slope on the graph 700 implies that particulate matter is becoming non-uniform on the filter, typically due to soot oxidation or noxidation burning holes through the soot layer.

Non-uniform accumulation typically occurs following a partial 602 regeneration, or when previously accumulated particulate matter is mal-distributed. When there is no soot oxidation occurring, the exhaust flow goes preferentially through holes in the soot layer, depositing more soot in those areas of the filter than in areas that have more soot. Therefore, when the filter is filling with soot, the accumulated particulate matter becomes more evenly distributed, as illustrated by an increase in the uniform distribution factor 702.

In the depicted graph 700, time 704 begins with a newly installed filter 150 with no particulate accumulation, which indicates a uniform distribution factor of one (706). As particulate matter begins to accumulate, the distribution 702 at first tends 708 to the nominal uniformly distributed line 716. Note that the nominal line 716 is less uniform than the perfectly clean line, or a uniform distribution factor of one. When a partial regeneration occurs, as at 712, the uniformity is decremented 710 according to the conditions of that partial regeneration. Any time the filter is merely filling with no oxidation, the distribution decays back 714 toward the nominal distribution line 716. Note that the decay toward the nominal uniformity can be either a decreasing 708 or increasing 714 uniformity event. A complete regeneration 718 resets the uniformity to a preset value, while a deep clean regeneration 706 resets the uniformity to a different, higher preset value. In certain embodiments, the deep clean regeneration may reset the uniform distribution factor to its greatest value.

There may be other events besides the detection of a regeneration event where the system can determine the uniformity level, as described in one or more of the related patents referenced herein.

Determining the uniformity of the distribution of particulate matter on a particulate filter facilitates estimating the true condition of the particulate filter 150. As a result, the sensor input from the differential pressure sensor 160 may be weighted according to a known or estimated condition of the particulate filter 150 in certain embodiments. For example, if a partial regeneration event 710 has recently occurred, the controller 202 may recognize that although the delta-pressure sensor 160 estimates a low mass estimate for the particulate accumulation, the controller 202 may assume that the distribution of the particulate matter on the filter 150 is non-uniform, and thus the accumulated particulate matter is actually greater than the amount estimated by the delta-pressure sensor 160. As exhaust gas passes through the particulate filter, the distribution becomes more uniform and the delta-pressure sensor 160 consequently becomes more reliable as a source for accurate feedback.

A history of detected regeneration events may facilitate determining reliable feedback and may further be utilized as a source of information to estimate a response or to determine a trend in soot accumulation. The regeneration detection module 212 may further provide valuable information to a controller 130 or to other control mechanisms to facilitate maintenance of an exhaust gas after-treatment system 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting a regeneration event on a particulate filter operatively connected to an internal-combustion engine, the method comprising:

receiving input regarding engine operating conditions and exhaust gas produced as a byproduct of engine operation;

determining an oxidation rate of soot accumulated on the particulate filter from the received input;

determining whether an oxidation rate of soot accumulated on the particulate filter has attained a level sufficient to indicate that a filter regeneration event is occurring;

determining a rate of soot deposition on the particulate filter;

determining an amount of soot accumulated on the particulate filter;

determining an amount of soot oxidized during a detected filter regeneration event; and categorizing the detected filter regeneration event according to the determined amount of soot oxidized and the amount of soot accumulated on the particulate filter.

2. The method of claim 1, further comprising determining whether an oxidation rate of soot on the particulate filter indicates than an active filter regeneration attempt is ineffective.

3. The method of claim 1, wherein determining an oxidation rate of soot further comprises referencing a model for defining soot oxidation relationships.

4. The method of claim 1, further comprising using a detected regeneration event to determine a distribution of particulate matter on the particulate filter.

5. A signal bearing medium tangibly embodying a program of machine-readable instructions executable by a digital processing apparatus to perform operations to detect a regeneration event on a particulate filter, the operations comprising:

receiving input regarding engine operating conditions and exhaust gas produced as a byproduct of engine operation;

determining an oxidation rate of soot accumulated on the particulate filter from the received input;

determining whether an oxidation rate of soot accumulated on the particulate filter has attained a level sufficient to indicate that a filter regeneration event is occurring;

determining a rate of soot deposition on the particulate filter;

determining an amount of soot accumulated on the particulate filter;

determining an amount of soot oxidized during a detected filter regeneration event; and categorizing the detected filter regeneration event relative to the determined amount of soot oxidized and the amount of soot accumulated on the particulate filter.

6. The signal bearing medium of claim 5, wherein the instruction further comprise an operation to determine whether an oxidation rate of soot accumulated on the particulate filter indicates than an active filter regeneration attempt is ineffective.

7. An exhaust gas after-treatment system for detecting a regeneration event on a particulate filter, the system comprising:

an internal combustion engine that produces exhaust gas as a byproduct of operation;

a differential pressure sensor configured to determine the pressure of exhaust gas upstream and downstream from the particulate filter; and a controller configured to communicate with the internal combustion engine and the differential pressure sensor and to determine an oxidation rate of soot accumulated on the particulate filter, the controller further configured to determine whether the oxidation rate of soot has attained a level sufficient to indicate when a filter regeneration event is occurring, to determine an amount of soot oxidized during a detected filter regeneration event, and to categorize the detected filter regeneration event according to the determined amount of soot oxidized and the amount of soot accumulated on the particulate filter.

8. The system of claim 7, further comprising a model for defining soot oxidation relationships.

9. An apparatus to detect a regeneration event on a particulate filter, the apparatus comprising:

an input module, the input module configured to receive input regarding engine operating conditions and exhaust gas produced as a byproduct of engine operation;

an oxidation module, the oxidation module configured to communicate with the input module and determine an oxidation rate of soot accumulated on the particulate filter;

a regeneration detection module, the regeneration detection module configured to determine whether an oxidation rate of soot accumulated on the particulate filter has attained a level sufficient to indicate that a filter regeneration event is occurring, wherein the regeneration detection module further comprises a soot load estimation module, the soot load estimation module configured to determine an amount of soot accumulated on the particulate filter, wherein the regeneration detection module is further configured to determine an amount of soot oxidized during a detected filter regeneration event, wherein the regeneration detection module further comprises a categorization module, the categorization module configured to categorize the detected filter regeneration event relative to the determined amount of soot oxidized and the amount of soot accumulated on the particulate filter, and wherein the detected filter regeneration event is categorized as one of a partial regeneration event, a complete regeneration event, and a deep clean regeneration event; and a particulate module, the particulate module configured to determine the rate of soot deposition on the particulate filter.

10. The apparatus of claim 1, wherein the filter regeneration detection module is further configured to determine whether an oxidation rate of soot accumulated on the particulate filter indicates than an active filter regeneration attempt is ineffective.

11. The apparatus of claim 10, further comprising an event trigger module, the event trigger module configured to trigger an event in response to the detected filter regeneration event.

* * * * *